April 21, 1936.  E. A. JOHNSTON  2,037,983
RUBBER TRACK FOR TRACK LAYING TRACTORS
Filed Aug. 11, 1934  2 Sheets-Sheet 1
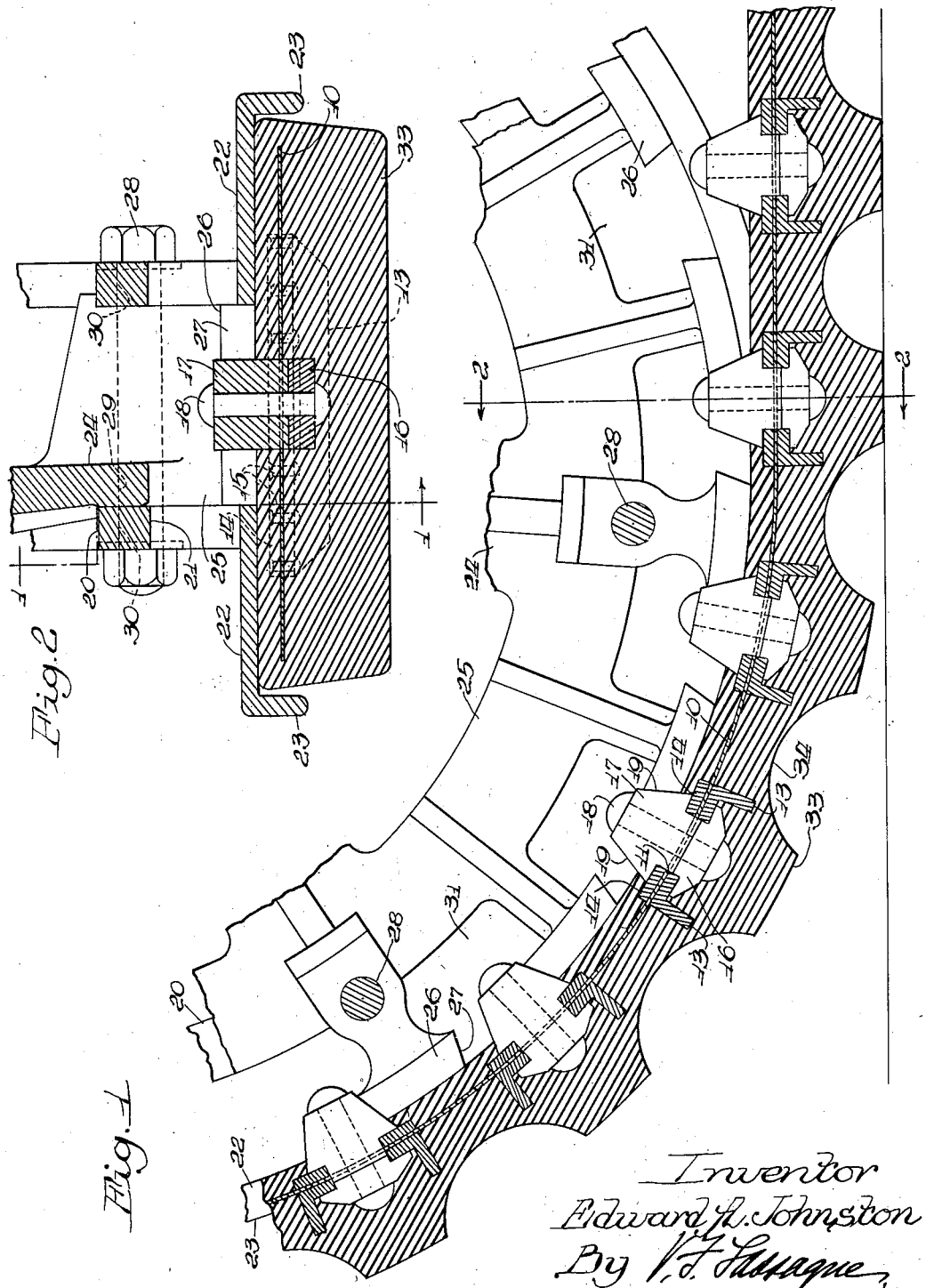
Inventor
Edward A. Johnston
By V. F. Lasaque
Atty.

April 21, 1936.  E. A. JOHNSTON  2,037,983
RUBBER TRACK FOR TRACK LAYING TRACTORS
Filed Aug. 11, 1934   2 Sheets-Sheet 2
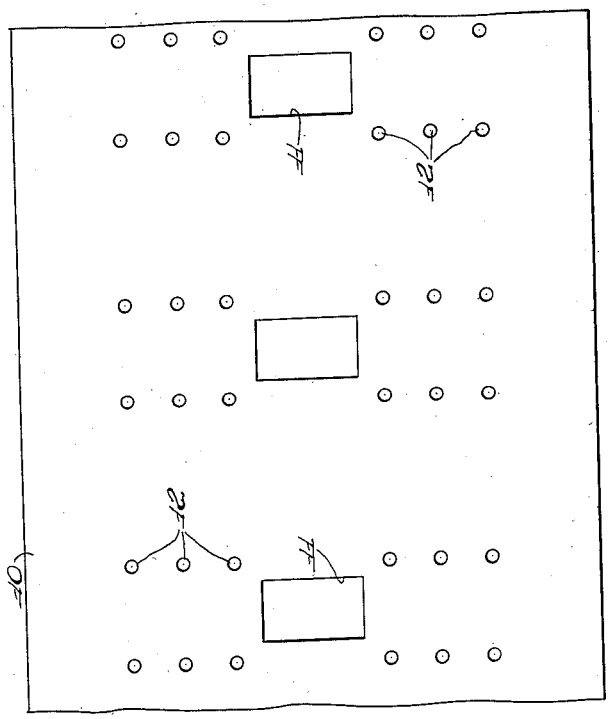
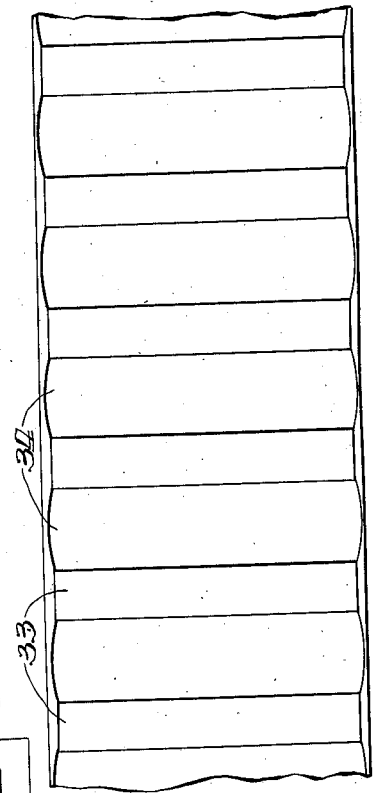
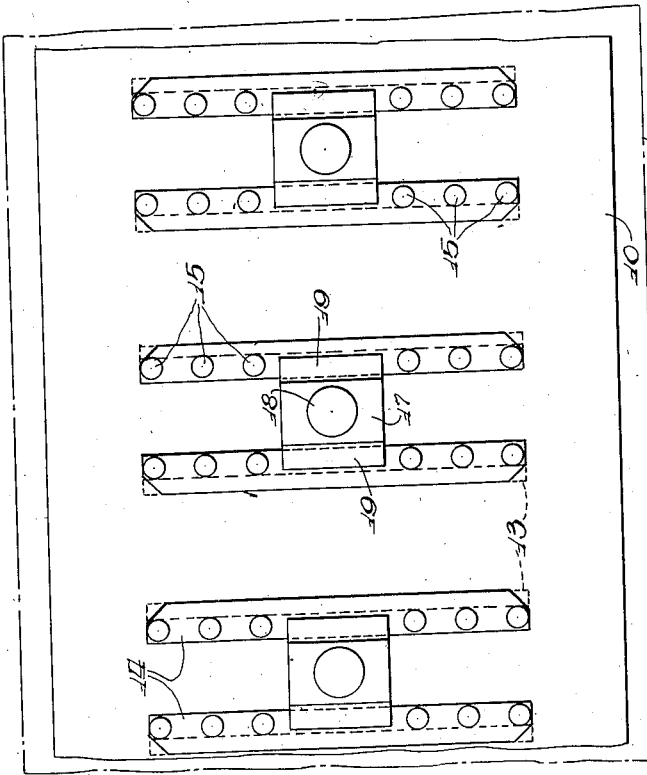
Inventor
Edward A. Johnston Patented Apr. 21, 1936

2,037,983

UNITED STATES PATENT OFFICE 2,037,983

RUBBER TRACK FOR TRACK LAYING TRACTORS

Edward A. Johnston, Chicago, Ill., assignor to International Harvester Company, a corporation of New Jersey Application August 11, 1934, Serial No. 739,443

5 Claims. (Cl. 305—10)

The invention relates to an endless, rubber track construction for use with track-laying tractors.

Such rubber tracks have many advantages over the usual metal articulated link tracks now commonly in use. For instance, the metal track wears badly, is noisy, and limits the speed of the tractor. On the other hand, rubber tracks have no hinge connections to wear; there is no clatter and noise; and, lastly, greater speeds are possible. The main trouble with rubber tracks so far produced is that they are not sufficiently durable.

Accordingly, the primary object of this invention is to provide a rubber track of ample suppleness and flexibility and which, because of its constructional reinforcement, will have the characteristic of durability.

Another object is to anchor in the track a novel form of driving lug to take the thrust of the driving wheel in operating the track to move the tractor.

Other important objects will be apparent to those skilled in the art as the disclosure is more fully made.

Briefly, these important objects may be achieved by the example of the invention illustrated in the accompanying sheets of drawings wherein an endless, flexible, flat sheet metal band, in the nature of saw band steel, is provided, having pairs of metal angle bars arranged at spaced intervals on the outer surface of the metal band. Between each such pair of angle bars the band is provided with a hole to receive a driver lug of metal, and flat strips, also of metal, are arranged on the inner surface of the band and riveted through the band to the angle bars. These lugs are in two parts bolted together and interlocked with the angle bars and strips for secure anchorage in the band. The metal parts thus described comprise a flexible reinforcing insert which is placed in a suitable mold for the purpose of molding therearound a rubber covering constituting the ground engaging traction band embodying on its ground contact side spaced transverse cleats to increase the tractive effort of the track. In these drawings:

Figure 1 is a fragmentary side sectional view of the assembled track and driver wheel taken along the line 1—1 of Figure 2, looking in the direction of the arrows;

Figure 2 is a detail transverse cross sectional view through the assembled driver wheel and track, taken along the line 2—2 of Figure 1, looking in the indicated direction;

Figure 3 is a plan view of the inner surface of a section of the assembled metallic reinforcement per se;

Figure 4 is a plan view of a portion of the steel band per se; and,

Figure 5 is plan view of a section of the traction side of the rubber track.

As shown in Figures 1 and 2, the metallic insert or reinforcement of the improved flexible rubber track embodies a continuous, endless, flat, spring steel, flexible band 10 in the nature of saw band steel. As appears best in Figure 4, this thin steel or metal band is provided along its longitudinal center line, at spaced intervals, with rectangular cut-out holes 11. In parallel cross rows at each side of each hole 11 are rivet holes 12. On the radial outer surface of the band 10 are arranged cross, metal, angle bars 13, as shown in Figure 1, and thereabove on the inner surface of the band are flat, cross metal strips or bars 14. Rivets 15, passed through the holes 12, serve to securely fasten the strips 14, bars 13, and band 10 permanently together, as shown in Figure 2. These bars 13, 14 provide transverse strength for the band 10, as they run substantially across the major portion of the width of said band 10, but, as each pair is longitudinally spaced apart, they do not materially interfere with the flexibility and suppleness of the band when operating on the ground.

Driving lugs are anchored to the band 10 and bars 13, 14 in the holes 11, each lug comprising an outer plate 16, as appears best in Figures 1 and 2, said plates fitted into the space between the bars 13 and overlapping and bearing on the adjacent flanges of the said angle bars 13. The inner side of the band carries the lugs proper, shown at 17, fitting into the space between the bars 14 and overlapping them to bear thereon. A bolt 18 is passed radially through the lug 17 and plate 16 securely to fasten these parts to the bars 13, 14 and thus to the band 10. All shearing strains and stresses, during use, from these lugs 17 are thus primarily taken by the bars 13, 14 to save the relatively thin steel band 10 from injury. Opposite sides of these lugs 17, in the direction of travel, are sloped as at 19 so that the driving torque from the driven wheel now to be described is properly transmitted.

The driver wheel, as shown in Figures 1 and 2, comprises a pair of spaced, radially disposed rims 20 skeletonized to provide lightener holes 21, which also serve to let out dirt accumulations. Each rim includes an outwardly extending lateral rim portion 22, radially flanged at 23 at their outer edges, as shown. Between these two spaced rims 20 is disposed an intermediate wheel 24 having a circumferential rim 25 formed at spaced intervals with radially disposed driving projections 26 having opposite faces, in the direction of travel, sloped, as at 27, for engagement with the slopes 19 on the lugs 17 heretofore described. This wheel 24 is located between the two rims 20 and securely bolted thereto at intervals by transverse bolts 28 passed through holes 29 in the part 24 and holes 30 in the rims 20. When the wheel 24 and rims 20 are so secured together, the spaces 31 between the projections 26 register with the holes 21 to form continuous transverse openings, as shown in Figures 1 and 2. The wheel 24, of course, has a hub for journaling on a drive shaft, not shown, on the tractor to drive the said wheel.

To complete the rubber track, the metal band 10, carrying the lugs 17 and bars 13, 14, as described, is placed in an appropriate mold and rubber is molded around and vulcanized to the metal parts. This thick rubber sheath completely embeds the metal reinforcement, so that only the driving lugs 17 protrude therefrom on its inner surface. The tread surface, or ground engaging side of the track, is coated with a thick sheath of the rubber, as shown in Figure 1, said rubber track portion formed with deep grouser portions 33 and intermediate grooves 34. The thick grouser portions 33 are radially in line with the lugs 17 and thus are relatively strong in taking the driving load, whereas the thinner groove portions 34 are located between the lugs 17 to insure ample flexibility for the track. The track thus formed is guided between the flanges 23 to prevent it from accidentally running laterally off the driving wheel.

From this detailed description, it will now be seen that an improved, durable rubber track has been provided, the use and operation of which is simple. The track is wrapped around the driving wheel 24 and an idler wheel, not shown. When the wheel 24 is operated, its projections 26 drivingly engage the lugs 17 to drive the track. The lugs 17 and driving projections 26 are constructed to operate equally well either ahead or in reverse, as can be seen.

It is the intention to cover all changes and modifications not departing from the scope of the invention which is hereinafter claimed.

What is claimed is:

1. A track comprising a flexible endless sheet metal band provided at intervals with openings, metal bars secured to opposite sides of the band adjacent each opening, a lug located in each opening and clamped to said bars, and a rubber coating molded to said parts to enclose the same with only one end of the lugs projecting therefrom.

2. A track comprising a flexible endless sheet metal band provided at intervals with openings, metal bars secured to opposite sides of the band adjacent each opening, a lug located in each opening and comprising two parts bolted together and interlocked with the bars, all of the parts mentioned being encased in a rubber coating with only one end of the lugs projecting therefrom.

3. A track comprising a flexible endless sheet metal band provided at intervals with openings, a bar arranged transversely of the band adjacent each hole, said bar being secured by riveting to the band, a driving lug arranged in each opening and disposed normal to the plane of the band, means securing the lugs to the bars in fixed relation to the band, a rubber sheathing molded around the band to provide an all rubber ground traction side for the track with only the lugs projecting from the side of the track opposite to its said traction side.

4. A track comprising a thin flexible endless sheet metal band provided at intervals with openings, substantially parallel metal bars arranged transversely of the band on opposite sides of the holes and on opposite sides of the band, the bars on the traction side of the band including a projection substantially normal to the plane of the band, means for fastening the bars in pairs to the band, driving lugs anchored in the holes to the adjacent bars, said lugs being disposed normal to the plane of the band, and a rubber sheathing molded around the band, bars and lugs to imbed said parts with only the lugs projecting partly from the sheathing on the side of the track opposite its traction side.

5. A track comprising a thin flexible endless sheet metal band provided at intervals with openings, substantially parallel metal bars arranged transversely of the band on opposite sides of the holes and on opposite sides of the band, the bars on the traction side of the band including a projection substantially normal to the plane of the band, means for fastening the bars in pairs to the band, driving lugs anchored in the holes to the adjacent bars, said lugs being disposed normal to the plane of the band, a rubber sheathing molded around the band, bars and lugs to imbed said parts with only the lugs projecting partly from the sheathing on the side of the track opposite its traction side, said traction side of the sheathing including alternate transverse grooves and raised cleat portions, the transverse bars having their ends disposed short of the marginal edges of the metal band, and the metal band having its marginal edges disposed short of the marginal edges of the rubber sheathing.

EDWARD A. JOHNSTON.